United States Patent
Mashinsky (10) Patent No.: US 9,811,600 B2
(45) Date of Patent: Nov. 7, 2017

(54) EXCHANGE OF NEWLY-ADDED INFORMATION OVER THE INTERNET

(75) Inventor: Alex Mashinsky, Memphis, TN (US)

(73) Assignee: PARADIGM SHIFTING SOLUTIONS, New York, NY (US)

(*) Notice: Subject to any disclaimer, the term of this patent is extended or adjusted under 35 U.S.C. 154(b) by 0 days.

(21) Appl. No.: 10/594,264

(22) PCT Filed: Mar. 28, 2005

(86) PCT No.: PCT/US2005/010088
§ 371 (c)(1),
(2), (4) Date: Apr. 2, 2007

(87) PCT Pub. No.: WO2005/098675
PCT Pub. Date: Oct. 20, 2005

(65) Prior Publication Data
US 2007/0282795 A1  Dec. 6, 2007

Related U.S. Application Data

(60) Provisional application No. 60/557,017, filed on Mar. 26, 2004.

(51) Int. Cl.
*G06F 7/00* (2006.01)
*G06F 17/30* (2006.01)

(52) U.S. Cl.
CPC .............................. *G06F 17/3089* (2013.01)

(58) Field of Classification Search
CPC ........... G06F 17/3089; G06F 17/30861; G06F 17/30165; G06F 17/30867; G06F 17/60;
(Continued)

(56) References Cited

U.S. PATENT DOCUMENTS 4,300,230 A * 11/1981 Philip et al. .................. 370/244
4,365,330 A * 12/1982 Chopping et al. ............ 370/370
(Continued)

FOREIGN PATENT DOCUMENTS

| EP | 1 050 830 A2 | 11/2000 |
| WO | PCT/WO 97/10558 | 3/1997 |
| WO | PCT/WO 98/34189 A | 8/1998 |

OTHER PUBLICATIONS

Yan T W et al., "Sift—A Tool for Wide-Area Information Dissemination" USENIX Technical Conference, Jan. 16, 1995 pp. 177-178, XP000617276.
(Continued)

*Primary Examiner* — Daniel Kuddus
(74) *Attorney, Agent, or Firm* — Dilworth Paxson LLP; Edward F. Behm, Jr.

(57) ABSTRACT

System and method for collecting and supplying ranked (270), indexed information as a premium service to users and advertisers. An information exchange is operated so as to aggregate, publish and subscribe Really Simple Syndication (RSS) and web services based information from different web based (110) and proprietary network sources. Recently published news or inventory information, new services or products are published into the system. Upon entry of the information, it is processed and distributed by the system to people, related parties or other systems that have expressed an interest in being notified of the type of published information as it becomes available.

47 Claims, 4 Drawing Sheets

(58) Field of Classification Search
CPC .............. G06Q 30/0277; G06Q 40/04; G06Q 30/0269; G06Q 30/0275; G06Q 30/02; G06Q 30/0283
USPC .......................................... 707/706, 999.002
See application file for complete search history.

(56) References Cited

U.S. PATENT DOCUMENTS

| | | | |
|---|---|---|---|
| 5,537,314 A * | 7/1996 | Kanter | 705/14.13 |
| 5,678,041 A * | 10/1997 | Baker et al. | |
| 5,790,785 A * | 8/1998 | Klug et al. | 726/11 |
| 5,848,396 A * | 12/1998 | Gerace | 705/7.33 |
| 5,895,471 A * | 4/1999 | King et al. | |
| 5,930,818 A * | 7/1999 | Suu et al. | 711/115 |
| 5,944,824 A * | 8/1999 | He | 726/6 |
| 6,012,087 A * | 1/2000 | Freivald | G06F 17/3089 707/E17.116 |
| 6,021,409 A | 2/2000 | Burrows | |
| 6,029,175 A * | 2/2000 | Chow | G06F 17/30899 |
| 6,044,372 A * | 3/2000 | Rothfus | G06Q 10/10 |
| 6,256,639 B1 * | 7/2001 | Himmel | G06F 17/30884 707/769 |
| 6,321,228 B1 * | 11/2001 | Crandall et al. | |
| 6,327,590 B1 * | 12/2001 | Chidlovskii et al. | 707/734 |
| 6,405,191 B1 * | 6/2002 | Bhatt et al. | 707/694 |
| 6,460,036 B1 * | 10/2002 | Herz | 707/748 |
| 6,490,601 B1 * | 12/2002 | Markus et al. | 715/207 |
| 6,519,571 B1 * | 2/2003 | Guheen | G06Q 30/02 705/14.66 |
| 6,721,716 B1 * | 4/2004 | Gross | G06Q 20/02 705/34 |
| 6,947,924 B2 * | 9/2005 | Bates et al. | 707/708 |
| 7,359,894 B1 * | 4/2008 | Liebman et al. | |
| 7,428,661 B2 * | 9/2008 | Michael | G06F 11/2236 714/27 |
| 2002/0029186 A1 * | 3/2002 | Roth et al. | 705/37 |
| 2002/0049738 A1 * | 4/2002 | Epstein | G06F 17/30864 |
| 2002/0072674 A1 * | 6/2002 | Criton | A61B 8/0883 600/454 |
| 2002/0072974 A1 * | 6/2002 | Pugliese, III | G06Q 30/02 705/14.16 |
| 2002/0184200 A1 * | 12/2002 | Ueda | G01C 21/28 |
| 2003/0050924 A1 * | 3/2003 | Faybishenko | G06F 17/30867 |
| 2004/0054589 A1 * | 3/2004 | Nicholas et al. | 705/14 |
| 2004/0054967 A1 * | 3/2004 | Brandenberger | G06F 17/3089 715/255 |
| 2004/0078297 A1 * | 4/2004 | Veres | G06Q 30/06 705/26.1 |
| 2004/0233897 A1 * | 11/2004 | Yamaguchi | H04L 63/08 370/352 |
| 2005/0060232 A1 * | 3/2005 | Maggio | G06Q 30/02 705/14.19 |
| 2007/0033103 A1 * | 2/2007 | Collins | G06F 17/2785 705/14.41 |
| 2010/0115559 A1 * | 5/2010 | Ellis | H04N 5/44543 725/53 |

OTHER PUBLICATIONS

Wyle M.F. "A Wide Area Network Information Filter" Proceedings International Conference Artificial Intelligence on Wall Street, Oct. 9, 1991, New York, Los Alamitos, CA, US, Oct. 9, 1991, pp. 10-15, XP000534152.

Franklin M. et al, "Data in Your Face Push Technology in Perspective" Sigmod Record, Sigmod, New York, NY, US, vol. 27, No. 2, 1998, pp. 516-519, XP000886180 ISSN: 0163-5808.

* cited by examiner

EXCHANGE OF NEWLY-ADDED INFORMATION OVER THE INTERNET

RELATED APPLICATIONS

This is a U.S. national stage of application No. PCT/US05/010088, filed on Mar. 28, 2005. Priority is claimed on the following application(s): Country: U.S.A., Application No. 60/557,017, Filed: Mar. 26, 2004 the content of which is incorporated here by reference.

BACKGROUND OF THE INVENTION

1. Field of the Invention

The present invention generally relates to the field of accessing and, more particularly to a system and method for collecting and supplying ranked and indexed information as a free or premium (e.g. pay) service to users and advertisers.

2. Description of the Related Art

The Internet has grown to such that it now contains several billion addresses. Each one of these addresses may have an associated website and content which changes without prior notice. Alternatively, websites may be dynamically linked to other sites or to devices via web services or xhtml links. Such changes in content and linkage may occur several million times a day. Oftentimes, these "postings" and changes are initiated by third parties. The search engines and other services looking for such changes may not always locate or index the sites. As a result, the web users may not be aware of postings or changes to these sites.

The increasing need for reliable and up to the minute search, price and news information has made it increasingly difficult to find and rank (e.g. by most recent order) new information one is looking for in the ever growing global Internet. For example, most conventional search and news gathering engines focus on crawling and indexing an existing and mostly static inventory of websites. Due to the sheer size of the internet, there is a growing lag between the time a new or existing site or content of the site is published and the time such information becomes available as indexed data on popular search engines. Although most information on the web is free, many subscribers and advertisers are willing to pay for such information if it can be delivered in a "ranked and indexed" format to each relevant subscriber based on queries supplied by the requestor of the information.

The global economy is becoming more and more integrated. As a result, access in real time to the latest relevant information has become critical to doing business, such information can make the difference between successful companies and unsuccessful companies that lag behind with respect to their ability to react to changes in the marketplace. Presently, the majority of competitive information is delivered by specialty research and financial firms via proprietary subscription to many fragmented networks, such as Bloomberg and Reuters. This information is used primarily by industries, such as the financial markets, which rely on this information. In addition, it is provided without any filtering, and it is up to the user to find relevant data in the vast quantity of publications, such as daily news releases and press announcements.

Although some search functions are available for searching publications, these search functions only provide limited access to on-line information, and cost additional usage fees. In addition, it is up to the user to initiate a query with clear knowledge and understanding of what he is searching for, as well as how to access the information and find its relevance. In most cases, such a search will not include the latest 30-90 days worth of publicly available information that resides somewhere on the World Wide Web (www). The concept of broadcasting the news to many subscribers is not new per se. However, there is no incentive, process or a single location which is capable of accepting, aggregating and redistributing all published information sources, as well as providing a fast and reliable control and query based real-time dissemination of such information. Accordingly, there is a need to provide a way to collect and supply ranked and indexed information service to users and advertisers.

There is also no system that collects and adds advertising or relevant information to such new information and then disseminates it to interested parties and provides for market based pricing for such advertising services.

As the majority of devices connected to the web migrate from being dominated by PCs to wireless handheld devices, the context and form of search and related services need to change to accommodate the special location, size and space limitations of these devices

SUMMARY OF THE INVENTION

The present invention is a system and method for collecting and supplying ranked, indexed information as a free or premium (e.g. pay) service to users and advertisers. In accordance with the invention, an information exchange is operated so as to aggregate, publish and subscribe Really Simple Syndication (RSS), web services and other protocol based information from different web based and proprietary network sources. In addition, real-time notification and access to the information is provided. Recently published news or price and inventory information, new services or products are published into the system. Upon entry of the information, it is processed and distributed by the system to people, related parties or other systems that have expressed an interest in being notified of the type of published information as it becomes available. RSS is an XML format for sharing headlines and other web content.

The delivery of the information is based on queries or listing topics, time, relevance and queries that system users, e.g., subscribers, etc., have placed within the system. In accordance with the invention, providers or "other users" use the information exchange to trigger web services and custom applications, as well as notifications resulting from the information or the results generated by processing a flow of information.

The present invention permits the creation of a marketplace for the attachment of value in the form of ads, alerts, competitive information or complimentary information for the transfer and distribution of information, and provides real-time market pricing for different sources of information and the price that different entities are willing to pay to tag, attach or advertise around such information. In addition, subscribers and publishers may use the information to sell content based on a pre-agreed price, while other subscribers may let the information exchange optimize their income based on current market prices. In addition such a system allows the aggregation of users into interest groups, customer profiles and spending levels and allows the marketplace to price the delivery of ads or information to such groups. The exchange allows advertisers to trigger ads based on events taking place and dynamically or manually initiate ads based on such events.

In accordance with one embodiment, a system for exchanging newly added information over the Internet provides a system database for storing queries input by system users which are used to retrieve information from the Internet pertaining to the stored queries. A search engine may be enabled to provide additional query results by being linked to such exchange and based on information uploaded from other users. An information exchange is provided for receiving information obtained from the information providers and/or the other users and for directing the received information to specific ones of the users based on the users queries, and an indexing and counter module coupled to the information exchange is provided for processing the received information and for providing data pertaining to the received information.

In accordance with another embodiment, a method for exchanging newly added information over the Internet is disclosed wherein new data from information providers or administrators is sent for processing or uploaded into an information exchange. Search queries are entered and stored as static queries in a system database, such static or dynamic queries being input from users or subscribers to the information exchange. Data is monitored at the information exchange to determine whether new data has been added to the information exchange by the information providers or the third parties. A determination is made as to whether any new uploaded data is responsive to the static queries and, if new uploaded data is determined to match the static queries, the matching data is sent over the Internet or other networks to the users or subscriber who entered the static queries.

The exchange creates an internal link and tagging system for all information processed through the exchange and ranks it by priority and relevance so a data tree on any topic is created and is accessible to all. This unique, time-line topic based tree provides an historical view of any subjects and all relevant information. As new alerts and data feeds come pouring into the exchange a new form of search and alert can be performed which creates an historical and contextual search map with related product and services links.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE EXEMPLARY EMBODIMENTS

The present invention is a system and method for collecting and supplying ranked, indexed information as a free or premium (e.g. pay) service to users and advertisers. In accordance with the invention, an information exchange is operated so as to aggregate, sort, rank, attach relevant info, publish, bill, collect and pay the appropriate parties. By using Really Simple Syndication (RSS), web services and other protocol based information feeds from different web based and proprietary network sources the exchange is always going to be more accurate and current than any news gathering organization or search engine using crawlers or outbound information gathering tools. In addition, real-time notification and access to the information is provided. In accordance with the invention, recently published news, inventory information, new prices and services or products are published into the system. Upon entry of the information, it is processed and distributed by the system to people, related parties or other systems that have expressed an interest in being notified of the type of published information as it becomes available. RSS is an XML format for sharing headlines and other web content.

The system and method of the present invention permits advertisers and information providers to "piggy back" on a data delivery system to deliver custom ads and other relevant complimentary or competitive information to subscribers. The delivery of the information is based on queries or listing topics, time, relevance and dynamic queries that subscribers have placed within the system or active links generated from within other programs to provide real time interactive work & search environment. In accordance with the invention, providers use the information exchange to trigger web services and custom applications, as well as notifications resulting from the information or the results generated by processing a flow of information. Users specify topics of interest and can be queried for more detail when information is found to further validate the notification. For example a programmer working on a virus fix can instantly be notified of work or solutions provided by others or the latest attempts, he can specify only specific sources or search for relevant topics by simply enabling his browser to be in an active search mode.

Google or Yahoo/Overture permit third parties including publishers and company owners to submit information for inclusion in their search engines, they also "crawl" the web to index many types of web pages. New technology standards are emerging to allow publishers and corporations to broadcast any changes or additions they make to their websites, directories, news groups or press announcements to third parties in an automated way. One such standard is RSS, but other standards may evolve in the future. The RSS standard is an XML format for sharing headlines and other web content. The purpose of such exchange of information is to collect many feeds from different sources, and after processing the information to convert or disseminate the information to interested parties in the same or some other format.

Figure 1:
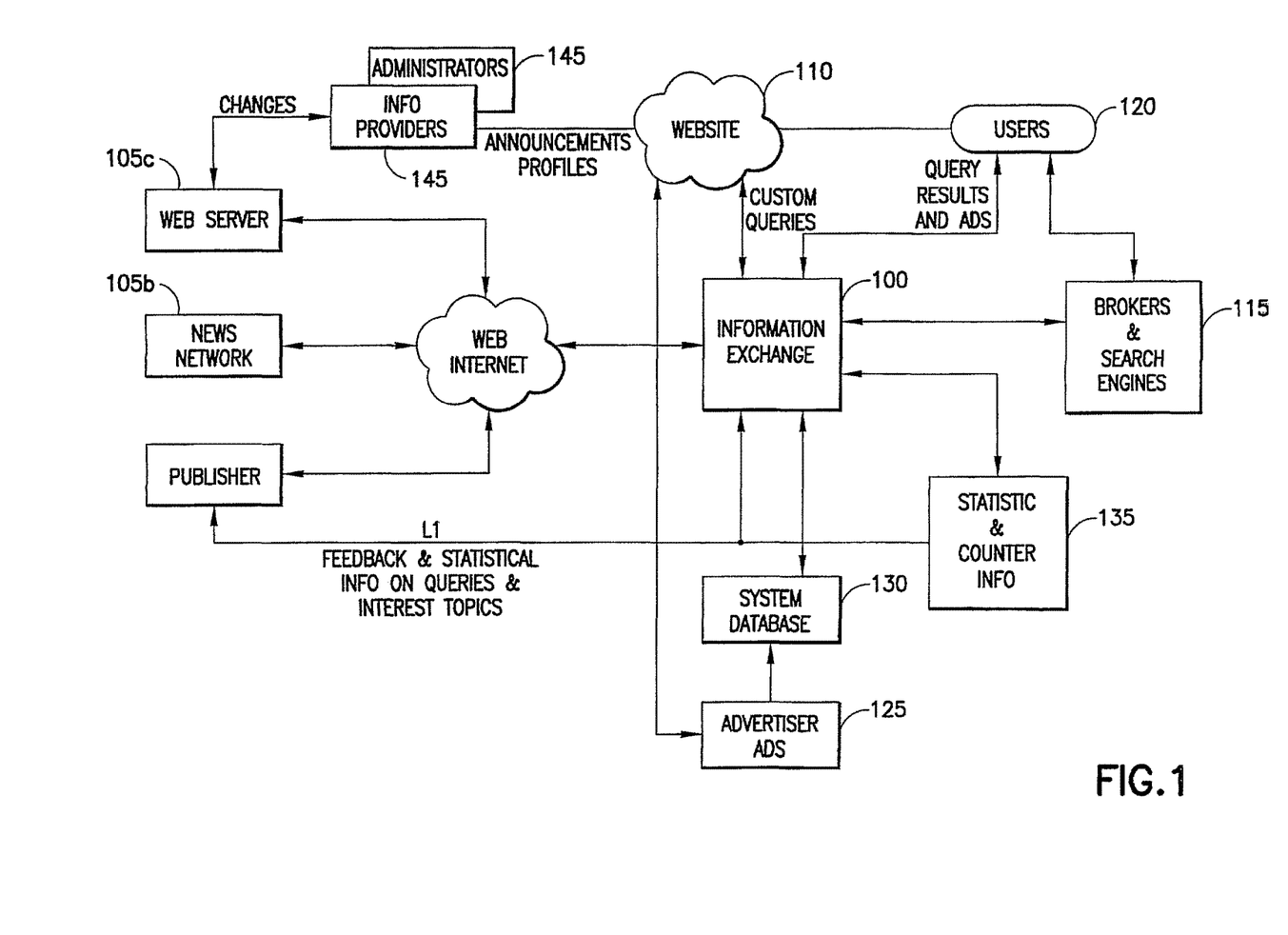
FIG. 1 is an exemplary schematic block diagram illustrating the interaction between different elements of an information exchange in accordance with the invention.

FIG. 1 is an exemplary schematic block diagram illustrating the interaction between different elements of an information exchange in accordance with the invention. With reference to FIG. 1, the system and method of the present invention aggregates published data and collects RSS and other fields from sites, companies and public information sources that do not publish their changes and additions, and processes the aggregated publications and data to be stored temporarily or indexed and stored permanently so such information can be matched to each of the search and profile query entries made by subscribers of the information exchange 100. Subscribers who are interested in being informed about specific news or announcements and changes made by specific companies may go to a website 110 and request such notifications to be sent to them in a specific format and to a specific device, such as a computer, cell phone, personal digital assistant (PDA) or some other web enabled device.

In accordance with the invention, information exchange 100 receives requests via other programs, brokers or aggregators or search engines 115 in "wholesale" data feeds. The requests may be generated by an operating system or a specific application while a user operates a wireless device or a computer each time a search is performed using a browser or the Internet. Users 120 may be asked if they wish to be notified about new results on such a search in the future. If a user accepts the invitation, the query is combined with other information provided by his device or computer, web service, or the search engine used, such as advertisements stored in ad database 125.

Upon matching such queries the exchange adds advertisements previously placed by advertisers who used the website 110 and system database 130 to place bids and contract with information exchange 100 and its partners to deliver specific ads and information to a target audience. The combined information is translated into a complex query based on the user's profile, other previously entered user information and/or a ranking of search results as well as third party trigger events such as news, key words and change in prices or total users in a specific group. After the delivery of such an alert, the exchange calculates the amount advertisers and third parties need to pay and the amount due to any publishers or users based on the pre agreed terms published on the exchange, and then credits each user account.

The information exchange 100 compares every piece of new data that is collected and matches it to an existing list of queries that is entered by users 120 or subscribers. If a match is obtained, it is analyzed via a logic flow, text searched and prioritized before a message engine translates it into a web link or combines it with other statistical or relevant data stored in an index and control module 135. The match is then sent to the subscriber or agent with any related files or additional information which may be requested by the user or determined important by the exchange. In accordance with the invention, the information exchange 100 may attach advertising or promotional information provided by third parties based on the subscriber's query or the topic matching a profile of the subscribers. For example if the user has a financial user profile, the alert may include stock symbols of the company's competitors or other news announcements. If the news is a video clip, the system may send a link or an actual video file to the local device for viewing. In addition, the information exchange 100 may charge a fee to the subscribers and third parties for distributing information based on an agreed amount, a transaction fee or a dynamic market in which advertisers bid for the right to be included first in such notifications. The information exchange 100 may also utilize artificial intelligence (AI), user feedback, Digital Objects Identifier (DOI) links, xhtml tags or other tools to enhance the ability to match the flow of information to the queries in the system, as well as to "self train" the system to permit users 120 to prioritize and focus their queries to relevant information aggregated by information exchange 100. In, general, comparison engines or other automated systems may contain millions of queries that access information exchange 100 at any given time and during use. Such users or engines may generate a substantial revenue stream if their users conversion ratio for goods and services is better than the current web advertising systems by providing enhanced services to their customers.

The Information exchange 100 provides an alternative to the traditional methods of submitting information to the public, such as via a press releases or web sites. Typically, such information is submitted with the hope that people who receive the information will actually read it. In the present invention, conventional systems are replaced by a system that gives publishers and sources of unique information a good reason to publish their data through the exchange, product announcements, pricing and promotional announcements, new prices, software or service releases can be directed to only interested parties. If content that matches the interests of subscribers is found, a function that is approved by the subscriber is performed. For example, the function may be providing a link about a press release to a specific set of subscribers who have indicated an interest in receiving such information or loading a demo of the program or service. The exchange can provide real time ranking info of other exchange users so subscribers can make instant decision about their interest to buy or try the service.

With additional reference to FIG. 1, activity on information exchange 100 is initiated when new data is generated by publishers 105*a*, news networks 105*b*, web services 105*c* or other information sources (IP). These sources are linked to the exchange via the Internet or via direct communication feeds L1. Administrators 145 of information sites can also access the website 110 through which they can administer their interaction with information exchange 100. Users 120 may access the exchange 100 via the website 110 or by entering searches via brokers and search engines 115. These entries are then translated into one time or ongoing queries with the information exchange 100 or the index and counter module 135.

In accordance with the invention, continuous monitoring of millions of information sources can be achieved with minimal effort and very low cost by indicating certain keywords or subjects to the information exchange 100 or other collection programs. Notifications can be sent almost immediately to a variety of communication devices, such as wireless devices, PDA's, computers, etc. In accordance with the invention, the messages or services will appear in a variety of formats and will support existing standards and proprietary systems, such as email, instant messengers, Short Message Service (SMS) messages and Bloomberg terminals.

In addition, information exchange 100 provides client software interface and personal web-logs which permit subscribers to manage their accounts, queries, budgets, profiles, historical events and prioritization that are stored in system database 130. Moreover, information exchange 100 also synchronizes user storage devices with all relevant information that is found. As a result, the subscribers are continuously provided with the latest data about the topics they care about most, and can access them immediately on their device without the need to access the network or use their computers. Preferably, the subscribers are provided with up to 60 days of the latest information which may include voce video and data on their topics of choice which they may access locally without internet connections since the exchange synchronizes their data when they are available online.

The Information exchange 100 has a direct XML or other type of "feed" from every information provider 140 and from every web server 105c that indicates a new list of updated content or the occurrence of changes to existing content. The list of changes may be organized under standard NAICS/SIC codes or use XML headers for classifications to permit the ease with which content is matched and distributed to interested parties. As a result, owners of content are permitted to publish specific information while keeping other information confidential.

Many websites do not allow crawlers or non-subscribers to access internal data. As a result, the majority of the information on the website is not accessible to search engines. In contrast, information exchange 100 functions as a trusted partner in collecting, processing and notifying specific subscribers with specific information which otherwise would not be available. Here, the information exchange 100 can also function as a central clearing facility to process large numbers of transactions which require micro payments that would otherwise not be economical for any of the individual information sources to process. The exchange can manage the login, security, and validation of subscriber information for millions of small publishers or information providers who may not have relationship with such clients but would like to charge for their service. In an embodiment of the invention, information exchange 100 manages and delivers advertising or competitive content on a publisher's original site when users utilize notifications by the exchange to link or visit the actual website of the publishers.

In another embodiment of the invention, the flow of information is used to generate profits for originators of content, aggregators or traders of ad queries, subscribers and advertisers of the information exchange 100. The exchange provides for full transparency of pricing related to any buy and sell offer for keywords or event triggered ads. Such transparency dramatically reduces the need for aggregators such as Google, Yahoo and other search engines who use a system by which advertisers bid blindly for keywords without knowing what the market price is to reach a user interested in such keyword. Such bids which are subsequently translated into commercial listings provided side by side with the free search results generated by the search engines provide a very high margin for the search engine. However the providers of the information and the users of the search engines do not have a way to generate income or obtain a portion of the fees charged by the search engine. In addition, the ability of the buyers of the keywords to refine their "hits" is limited, because Google has limited knowledge about the person performing the search or his real intent to buy or engage in commerce.

In contrast, the information exchange 100 of the present invention permits the publishers 105a, aggregators, subscribers and the information providers 140 to receive a portion of the fees charged by the information exchange, as well as to obtain the true value of what buyers and sellers are willing to pay or be paid for certain listings or for performing specific transactions since the exchange charges a transaction fee and not the margin between what it pays and what it collects from advertisers. Such full disclosure will immediately provide lower prices for advertisers and aggregate many users who will be happy to be paid for their daily queries. In another embodiment of the present invention, the collection and sale of statistical and usage information about transactions conducted by the exchange provides another source of revenues. Many sources including financial institutions and brokers will pay for such information since it can be used as an early indicator to show trends with products, companies, prices and services. Here, information exchange 100 makes all such information available to third parties for a fee.

In accordance with the present invention, an expanded list of topics that subscribers have interest in is managed, and proactive notification and formatting of such data is provided to users 120 whenever a topic appears on the Internet in the context requested by the subscriber. As a result, advertisers and businesses are permitted to more accurately target potential customers. In addition, the customization of when and what to send to each subscriber is performed. Different messages and different prices are also sent based on the specific events generated by third parties or the information exchange 100. For example, the system of the present invention permits an advertiser to indicate to the information exchange 100 that an ad about life insurance should be sent to all subscribers who have entered the word "disaster" only when news about a disaster event passes through the exchange. Similarly, a manufacturer may request to send a specific ad with a specific price each time a news release or posting about a product from a competitor passes through the information exchange. Here, the notice may be sent only to a specific set of subscribers which have provided a profile accepted by the manufacturer.

Information exchange 100 also uses a combination of events to generate leads. For example, a person moving from one home to another will indicate to the exchange he is interested in receiving information pertaining to his new location. Here, a list is created of competitive offers from movers, mortgage banks, insurance agents, local merchants and other relevant things the subscriber may need but may not think of. The exchange may also permit advertisers to target people who have completed a series of actions and select only those for a special promotion or for target marketing. The subscribers may request the exchange to always provide competitive information for any offer made by an advertiser as a way to use the exchange to validate the value of a specific offer.

With additional reference to FIG. 1, index and counter module 135 is provided so that information exchange 100 may also provide, or allow others to provide data about the information flowing through the exchange, as well as trigger notifications to users 120 when certain events occur. For example, when a business owner wants to know that the number of times a competitor is mentioned in the news exceeds a certain number or exceeds the number of times his own company is mentioned. Proactive searching and message delivery in this manner also permits subscribers of the information exchange to rank information sources and direct the associated data flow to specific inboxes or locations. Here, the rankings allow advertisers and businesses to better target their ads and to obtain a higher ratio of conversions to orders or visits to their websites.

In another embodiment of the invention, the information exchange 100 is used by information providers or third parties for custom notifications and the creation of a dashboard like facilitator which will collect alarms and notification information from the Internet and third parties. Here, subscribers are permitted to bid to be ranked highest to effect the order by which notifications may be sent out, as well as the time delay the subscriber may request before the message may be sent out to other competing subscribers.

Figure 2:
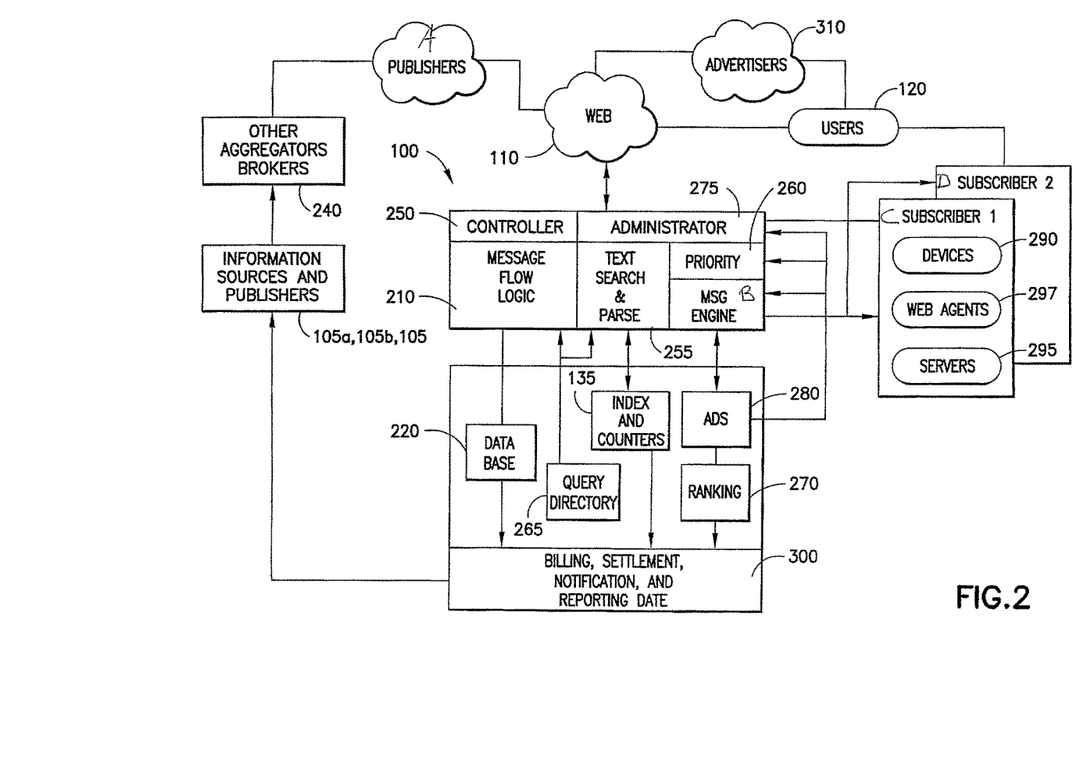
FIG. 2 is an exemplary schematic block diagram illustrating the processing of information collected by the information exchange of FIG. 1.

FIG. 2 is an exemplary schematic block diagram illustrating the processing of information collected by the information exchange 100 of FIG. 1. The information collected in the exchange 100 is divided into specific flows of information. With specific reference to FIG. 2, content from the information sources and publishers 105a, 105b, 105c is collected and provided to a message logic flow module 210. The message logic flow module 210 determines the source, content, priority, size, relevance and uniqueness of the information. In alternative embodiments of the present invention, other attributes such as historical information, related information, a ranking of the importance of the information, uniqueness of information, etc., are added to the message logic flow. This is possible because all message information is derived from the XML and other protocol information that are provided with website links.

Exchange database 220 or a memory resident hash table is used to store queries and counter and statistical analysis data in the index and counter module 135. The data in the information flow may be compared to other information located in exchange database 220 (e.g., information stored within index and counter module 135), and forwarded to other parts of the information exchange 100 or discarded.

Information exchangers or other aggregators, such as information brokers 240, are permitted to exchange additional information with the information exchange 100. A controller 250 is located in the information exchange 100. The aggregators or other information exchangers 240 are managed by the controller 250 which verifies and handles communication and content delivery to the users 120. The controller 250 may allow certain information to flow directly from 210 to 285 if it determined that the information is for public interest such as a notice from the federal government or a critical news alert. The controller 250 is also used to validate users 120 and to administer user preferences and rights to access and pay for certain information.

After the content in the information is processed by the message flow module 210 in the information exchange 100, a specific set of searches is conducted by the text search and parse engine 255 against text index and database search entries located in the index and counter module 135 to located matches and related links. The matched results are provided to a prioritization engine 260 which uses user queries stored in query directory 265 of exchange database 220 to rank the search results based on rankings stored in ranking directory 270 of exchange database 220. The prioritization engine 260 also forwards the ranked results to the administration module 275 of the information exchange, and accesses a billing and settlement database 300 which stores billing, settlement, notification and reporting information to confirm the identity of subscribers who need to be notified of their status and credit standing. Database 300 also performs all billing functions such as charging, collecting and crediting the appropriate parties against their transactions. The same member of the exchange may be charged in one transaction and be paid in the next, resulting in netting of all their charges and credits by the exchange.

The prioritization engine 260 forwards the search results to message engine 285 which packages the search results with specific ads stored in ad registry 280 of the exchange database 220 or other external ads and results and forwards them in the format and at the schedule requested by the subscribers to a predetermined destination, such as an internal web-log, external email, web agents 297, communication devices 290 and/or servers 295. The messaging engine 285 updates the billing and settlement database, to ascertain who should be charged for what and who should be credited as a result of the notice just sent since each notice may have a different combination and content and as such different pricing to the parties involved. The information exchange thus allows real time pricing for each transaction in contrast to today's static advertising environment.

After a subscriber is provided with a notification that requested content is available, a billing record is generated by a combination of the various processing modules of the exchange and sent to the billing and settlement database 300 so that real time settlement and billing information can be generated for internal use, as well as for use by external users of the information exchange 100. It should be noted that some of the aforementioned steps may be skipped if, for example, the subscriber is a search engine which is using the information exchange 100 to collect all published data, but is not billed for the receiving the information or any advertisements from the exchange.

In accordance with the invention, a subscriber may enter a website 110 via a computing device 290, servers 295 or web agents 297. Preferably, the computing device is a PDA, computer, mobile phone or some other web enabled device.

The entered search data is distributed by the information exchange 100 to the multiple modules or databases in exchange database 220 and compared to historical results, such as traffic volumes. In accordance with the invention, the subscriber may be provided with instant feedback on the frequency of the entered search data and the likely sources to provide such information in the future. The subscriber may then modify the request or confirm his entry. Upon confirming the entry, the multiple modules or databases in exchange database 220, in combination with the available data in the billing and settlement database 300, will determine if such a query is at no fee or should be charged, and will notify the subscriber of the decision. If the transaction is accepted by both parties, all relevant depositories in exchange database 220 are updated, and an attempt to match all new information from the information providers 140 that is loaded into information sources and publishers 105a, 105b, 105c and the aggregators and brokers 240 is performed. If a match occurs, relevant ads and other information are packaged and distributed to the relevant subscriber(s).

In accordance with the invention, an advertiser 310 may enter a website 110 and identify key words, trigger events, profiles of users or a minimum number of user groups in which he is interested. Here, a subscriber may view historical traffic volumes and prices paid by other advertisers for the identified categories or he may place complex instructions with the administrator module 275 to initiate ads or notifications under certain specific conditions or be added to certain user or interest groups which may pay a high price for accepting notifications. Such entries are processed by the information exchange 100, exchange database 220 and billing and settlement database 300. The entries are continuously monitored in order to optimize matching and spending by advertisers 310 on the information exchange 100. Such system provides for market based balance of supply and demand between advertisers and users or buyers which is governed by conversion rates instead of artificial pricing of keywords, the latter of which has no correlation to results or to the price of such hits.

When multiple subscribing members use the exchange 100, it is possible for them to interact in groups and view different parts of the bid and ask for spreads for different topics and details of the notification engine in the billing and settlement database 300. The multiple parties will see the real time status of their accounts, financial and historical transactions, and the trends and activities of the different members. This allows buyers to be informed about all offers in the market, provide for price transparency and be paid for evaluating different options from different providers.

Advertisers may embed complex tags, links, triggers and other forms of code to track the interaction of users with their offers sent by the exchange so they can match ads to actual orders on their systems and measure in high degree of assurance their conversion rates and cost per new order or new customer. By linking such results from their supply chain and internal systems directly to the information exchange, advertisers can automatically direct their budget away from groups and users who have low conversion rate to leads, notifications, events and triggers which have high conversion rates and reliably count on such data.

The contemplated embodiments represent only a small fraction of the uses information exchange 100 may provide to businesses and individuals who need to be notified about events and changes occurring worldwide. For example, in other embodiments, the information exchange 100 may also function as a third party web service clearinghouse to many other search engines and websites seeking to outsource the notification and management of their subscribers. As a result, an efficient and managed notification system is achieved, which simplifies and provides for a manageable individual portal of notifications and information. Such a solution may be integrated with existing email or IM programs to provide integrated messaging. Here, information exchange 100 can be used to provide free instant messaging for wireless devices by placing relevant ads or key word banners based in content sent from one wireless subscriber to another. As a result, the system of the present invention replaces an SMS system, where the sender and receiver pay for each message that is sent over the system. Similarly, an instant messenger or any other program can link via web services or xhtml to information exchange 100 and use it to serve ads or content to the users 120 or subscribers.

In another embodiment, information exchange 100 may charge some publishers for their data, while paying other publishers for their data. For example, a company issuing a press release may have to pay for submitting its data to the exchange, while a newspaper writing about such press releases may be paid by the exchange for the submission of its data. In a similar way, a subscriber to the exchange may pay to receive notifications from specific information sources, while being paid each time the notification from others is read. Here, the function of information exchange 100 is to collect, process, notify and settle the financial transactions resulting from each transaction triggered by the exchange based on a pre agreed financial formula entered by its members.

Figure 3:
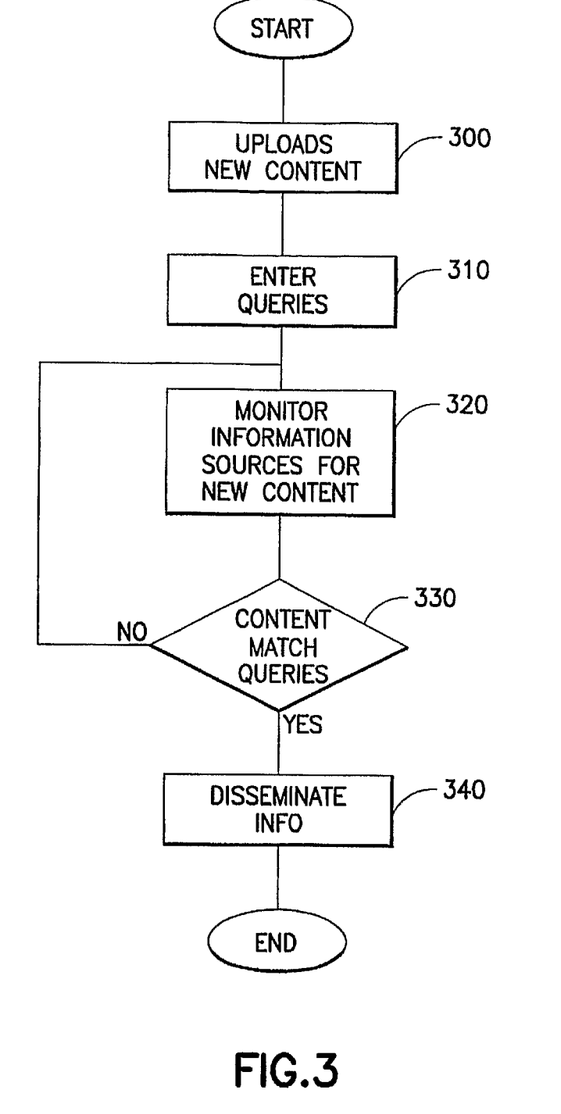
FIG. 3 is an flow chart illustrating exemplary steps of the method of the invention.

FIG. 3 is a flow chart illustrating the steps of the method of the invention in accordance with the invention. The method is implemented when new data is uploaded to the information exchange, as indicated in step 300. Here, the new data is content that is uploaded to the information exchange 100 by information providers 140 or administrators 145. The new data is made available to publishers 105a, new networks 105b and/or web servers 105c or other information sources (IP).

Search queries are entered and stored in the system database by users 120 or subscribers to the system, as indicated in step 310. In this case, the information exchange 100 receives requests via other programs, brokers or aggregators or search engines 115 in "wholesale" data feeds. The requests may be generated by an operating system or a specific application while a user operates a wireless device or a computer or each time a search is performed using a browser or the Internet. The users 120 may be asked if they wish to be notified about new results on such a search in the future. If the invitation is accepted, the query is combined with other information provided by his device or computer, web service, or the search engine used, such as advertisements stored in ad database 125. Here, advertisers use the website 110 and system database 130 to place bids and contract with information exchange 100 and its partners to deliver specific ads and information to a target audience.

The combined information is translated into a complex query based on the user's profile, other previously entered user information and/or a ranking of search results. This new query is entered into the system database 130 as a predetermined "static" query, which is accessed by information exchange 100.

The information exchange 100 continuously monitors the uploaded data to determine whether new data has been added to the information exchange by the information providers 140 or administrators 145, as indicated in step 320. Next, the information exchange 100 compares every piece of new data that is collected to a list of static queries entered by the users 120 or subscribers to locate content in the new data that matches the queries entered by the users 120, as indicated in step 330. If no match is obtained, a return to step 320 occurs, where the information exchange resumes monitoring the uploaded data to determine whether new data has been added to the information exchange.

If a match is obtained, it is analyzed via a logic flow, text searched and prioritized before a message engine translates it into a web link or combines it with other statistical or relevant data stored in the index and control module 135 (see FIG. 2).

At this stage, the information exchange 100 may attach advertising or promotional information provided by third parties based on the subscriber's query or the topic sent to a profile of the subscribers. In addition, the information exchange 100 may charge a fee to the subscribers and third parties for distributing information based on an agreed amount, a transaction fee or a dynamic market in which advertisers bid for the right to be included first in such notifications.

The matching content is then sent to the subscriber or agent (e.g. broker, etc.) who ordered the query over the information exchange 100, as indicated in step 340. The information is disseminated to the user or subscriber in a specific format and to a specific device, such as a computer, cell phone, PDA or some other web enabled device.

Figure 4:
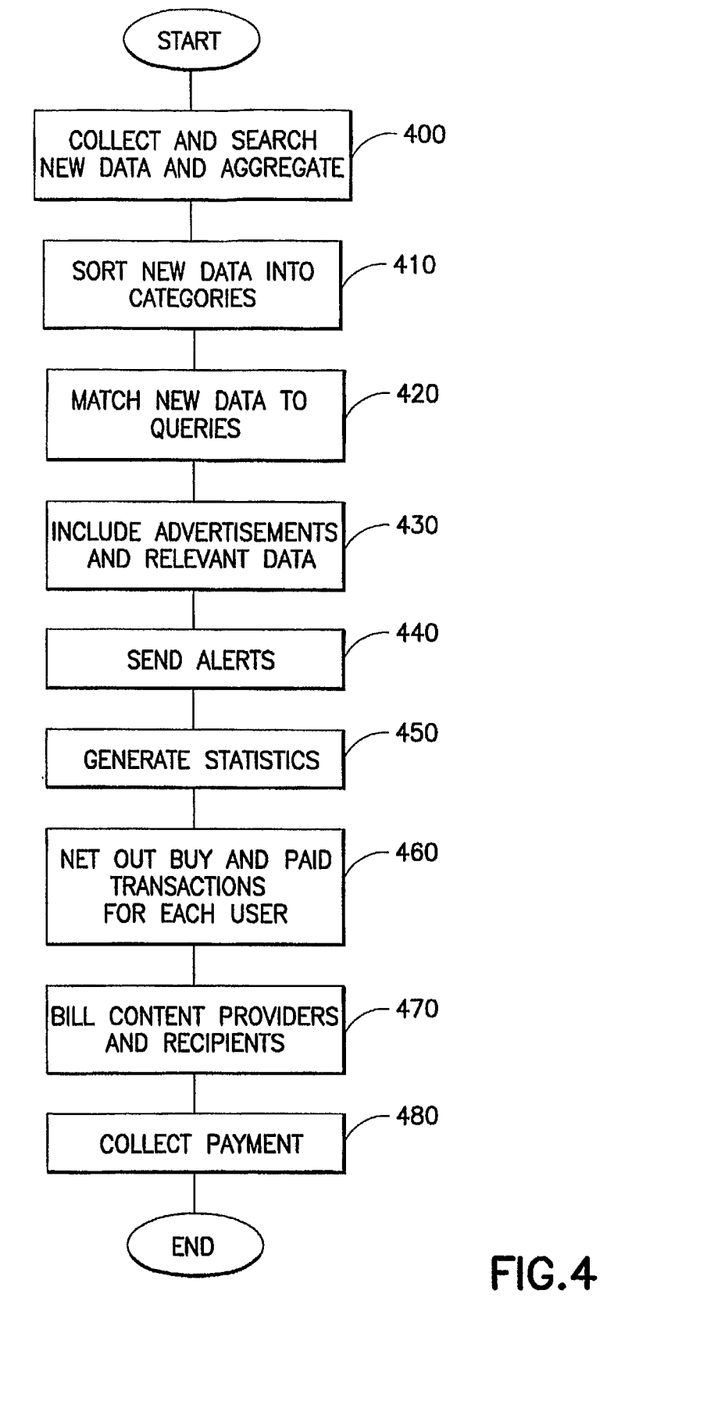
FIG. 4 is a flow chart illustrating alternative steps of the method in accordance with the invention.

FIG. 4 is a flow chart illustrating alternative steps of the method in accordance with the invention. The method is implemented when a search for new data is performed, as indicated in step 400. Once the new data is located it is aggregated and processed for temporary storage or indexing and stored permanently so such information can be matched to each search and profile query entries made by subscribers of the information exchange.

The aggregated data is then sorted into new categories, as indicated in step 410. Next, advertisements and relevant data are included in the new categories, as indicated in step 420. Here, the ads are ads that were previously placed in the system by advertisers who used the website 110 and system database 130 to place bids and contract with information exchange 100 and its partners to deliver specific ads and information to a target audience.

Alerts are sent to users or subscribers based on the queries that were previously entered, as indicated in step 430. Here, the combined information is translated into a complex query based on a user's profile, other previously entered user information and/or a ranking of search results as well as third party trigger events such as news, key words and change in prices or total users in a specific group.

Statistics related to the delivery and accessing of the ads are generated, as indicated in step 450. A calculation of purchases and payouts by each user is performed, as indicated in step 460. Here, the exchange 100 calculates the amount advertisers and third parties need to pay and the amount due to any publishers or users based on pre agreed terms published on the exchange, and then credits each user account.

Each content provider and user is then billed, as indicated in step 470. The collection of payments is then performed, as indicated in step 480. Here, billing and settlement database 300 is used to performs all billing functions, such as charging, collecting and crediting the appropriate parties against their transactions.

The present invention permits the creation of a market place for the transfer and distribution of information, and provides real-time market pricing for different sources of information and the price that different entities are willing to pay to tag, attach or advertise around such information. In addition, subscribers and publishers may use the information to sell content based on a pre-agreed price, while other subscribers may let the information exchange 100 optimize their income based on current market prices.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for information exchange implemented by software executing on a server system, the method comprising:

receiving, from a first one of a plurality of users, a request to be notified of information submitted to the server system by a particular one of the plurality of users;

receiving information submitted by the particular one of the plurality of users of the server system;

storing the received information as collected new information, wherein the collected new information is at least one of ranked and indexed;

providing access to the first one of the plurality of users to the new information;

selecting and inserting one or more advertisements into a notification;

transmitting the notification to the first one of the plurality of users, based on the request and in response to determining that the received information is associated with the particular one of the plurality of users; and allocating a portion of revenues generated by the one or more advertisements to the first one of the at least a plurality of users;

wherein the notification comprises at least a portion of the new information; and wherein multiple advertisers bid for inclusion of their advertisement to be at least one of the advertisements to be presented along with the new information.

2. The method as set forth in claim 1, wherein the plurality of users comprise a group of users managed by the server system.

3. The method as set forth in claim 2, further comprising authenticating each of the plurality of users as being a member of the group prior to the receiving information and receiving a request.

4. The method as set forth in claim 2, wherein the server system provides an information exchange service that carries electronic messages sent between different ones of the plurality of users of the group.

5. The method as set forth in claim 2, wherein the group of users managed by the server system comprises all of the plurality of users.

6. The method as set forth in claim 2, wherein the group of users managed by the server system comprises a subset of the plurality of users.

7. The method as set forth in claim 1, wherein each of the plurality of users is a member of an information exchange service administered by the server system.

8. The method as set forth in claim 7, further comprising validating each of the plurality of users as being a member of the information exchange service prior to the receiving information and receiving a request.

9. The method as set forth in claim 7, wherein the information exchange service carries electronic messages sent between different ones of the plurality of users.

10. The method as set forth in claim 9, further comprising: providing one or more advertisements to be presented with at least some of the electronic messages.

11. The method as set forth in claim 7, further comprising: collecting and selling statistical and usage information about the plurality of users and transactions conducted by the plurality of users.

12. The method as set forth in claim 7, further comprising: ranking the plurality of users as information sources; and accepting bids from advertisers for advertisements to be placed next to information associated with one of the ranked information sources.

13. The method as set forth in claim 1, wherein each of the plurality of users has a personal account, and further comprising providing a client software interface through which respective ones of the plurality of users manage their respective personal accounts.

14. The method as set forth in claim 1, wherein the server system provides an information exchange service that carries electronic messages sent between different ones of the plurality of users.

15. The method as set forth in claim 1, further comprising: selecting and inserting the one or more advertisements based at least partially upon a target audience.

16. The method as set forth in claim 15, wherein the one or more advertisements are selected based at least partially upon the new information.

17. The method as set forth in claim 16, wherein the one or more advertisements are selected based at least partially upon a target audience.

18. The method as set forth in claim 15, wherein the one or more advertisements are selected based at least partially upon a target audience.

19. The method as set forth in claim 1, wherein the notification is transmitted to a mobile device associated with the first one of the plurality of users.

20. The method as set forth in claim 1, wherein the notification includes an advertisement.

21. The method as set forth in claim 20, wherein multiple advertisers bid for the inclusion of their advertisement to be at least one of the advertisements to be presented along with the notification.

22. The method as set forth in claim 1, further comprising: providing an advertisement to be presented to the first one of the plurality of users along with the new information.

23. The method as set forth in claim 1, wherein the plurality of users comprises an interest group.

24. The method as set forth in claim 1, further comprising: associating one or more attributes with the new information.

25. The method as set forth in claim 1, further comprising: providing attribute information along with the notification.

26. The method as set forth in claim 1, further comprising: providing to the first one of the plurality of users status information concerning an account associated with the first one of the plurality of users.

27. The method as set forth in claim 1, further comprising:
maintaining a database of a plurality of new information submissions along with associated identification of source and time that each respective new information submission was made.

28. The method as set forth in claim 27, further comprising presenting to the first one of the plurality of users, indications of a plurality of new information submissions from a plurality of users specified by the first one of the plurality of users.

29. The method as set forth in claim 27, further comprising:
presenting to the first one of the plurality of users, indications of a plurality of new information submissions from the particular one of the plurality of users, in timeline sequence.

30. The method as set forth in claim 1, wherein the providing access is performed only in the event permission was previously granted by the particular one of the plurality of users for the at least a plurality of the multiplicity of users to be provided access.

31. The method as set forth in claim 1, wherein the providing access is performed without permission having previously been granted by the particular one of the multiplicity of users for the first one of the plurality of users to be provided access.

32. The method as set forth in claim 1, further comprising:
receiving a request for the new information sent by the first one of the plurality of users in response to the notification, and
sending the new information to the first one of the plurality of users as a result of the new information being submitted.

33. The method as set forth in claim 1, wherein the notification comprises the new information.

34. The method as set forth in claim 1, wherein the transmitting is performed by the software in real-time in response to the submission of the new information.

35. The method as set forth in claim 1, further comprising: validating the first one of the plurality of users as being entitled to receive the notification.

36. The method of claim 1, wherein the new information is organized as a time line topic based tree.

37. The method as set forth in claim 1, further comprising: measuring a conversion ratio of goods and services for each of the advertisements with respect to each of the plurality of users.

38. The method as set forth in claim 1, wherein multiple advertisers place buy and sell offers for placement of their advertisement along with the new information.

39. The method as set forth in claim 38, further comprising:
providing pricing and settlement information for each advertising placement transaction.

40. The method as set forth in claim 1, further comprising: making a determination as to whether the particular user is allowed to access the new information.

41. The method as set forth in claim 40, wherein the determination is based upon the willingness of the particular user to accept to receive one or more advertisements along with the new information.

42. The method as set forth in claim 1, further comprising: sending an invitation identifying the particular user to the first one of the at least a plurality of users.

43. The method as set forth in claim 1, wherein the indexing comprises providing data pertaining to the new information.

44. The method as set forth in claim 1, wherein the function is applied based on the content of the new information submitted to the server.

45. The method as set forth in claim 1, wherein the function is applied based on user profile information.

46. The method as set forth in claim 45, wherein the user profile information includes user requests to be provided access to new information submitted by selected ones of the plurality of users.

47. The method of claim 1, wherein the ranking is performed using a hash table.

* * * * *